United States Patent [19]

Chalas

[11] Patent Number: 5,392,386
[45] Date of Patent: Feb. 21, 1995

[54] METHOD AND APPARATUS FOR ADDING FUNCTIONALITY TO COMPUTER PROGRAMS EXECUTING UNDER GRAPHICAL USER INTERFACES

[75] Inventor: Uwe Chalas, Meinhard, Germany

[73] Assignee: Inter Hi-Tec AG, Zurich, Switzerland

[21] Appl. No.: 191,340

[22] Filed: Feb. 3, 1994

[51] Int. Cl.6 .............................................. G06F 15/00
[52] U.S. Cl. .............................. 395/155; 364/DIG. 1; 364/264; 364/276; 395/145; 395/146; 395/147; 395/156; 395/161; 395/650; 395/700
[58] Field of Search ................. 364/264, 276, DIG. 1; 395/145, 146, 147, 155, 156, 161, 650, 700

[56] References Cited

U.S. PATENT DOCUMENTS

| | | | |
|---|---|---|---|
| 5,146,553 | 9/1992 | Noguchi et al. | 395/146 |
| 5,175,895 | 12/1992 | Cheung et al. | 395/650 |
| 5,187,788 | 2/1993 | Marmelstein | 395/700 |
| 5,237,691 | 8/1993 | Robinson et al. | 395/700 |

OTHER PUBLICATIONS

Waters, Richard; "The Programmer's Apprentice: Knowledge Based Program Editing".

*Primary Examiner*—Kevin A. Kriess
*Assistant Examiner*—Jon H. Backenstose
*Attorney, Agent, or Firm*—Townsend and Townsend Khourie and Crew

[57] ABSTRACT

A system for adding functions to an existing application program executing in a computer system having a graphical user interface that includes a clipboard. The invention displays menu options either on an added menu within the application program or on a menu separate from the application program. The invention intercepts communications between the operating system and the application program and determines when the user is invoking one of the added functions. Simulated user input commands are issued to the operating system to capture information from the application program to the clipboard. The information in the clipboard is processed to provide additional features such as on-the-fly spell checking or translation and the modified information is replaced in the application program by transferring from the clipboard using more simulated user input commands.

16 Claims, 7 Drawing Sheets

This is an example of text with formatting symbols. This text is bold. <u>This text is underlined.</u> <u>*Another style.*</u> Original style. }—450

[Tab][Tab]This is an example of text with formatting symbols. [UND]This[SRt]
text is underlined.[und]  [BOLD]This text is bold.[bold]  [Font:CG Times Bold
12 pt][UND]Another[und] style.[Font:Courier 10cpi] Original[SRt] style.[HRt] }—452
                          ‾‾‾‾‾‾‾
                            453

[Tab][Tab]This is an example of text with formatting symbols. [UND]This[SRt]
text is underlined.[und]  [BOLD]This text is bold.[bold]  [Font:CG Times Bold
12 pt][UND]Another[und] stil.[Font:Courier 10cpi] Original[SRt] style.[HRt] }—454
      ‾‾‾                ‾‾‾‾
      451                 455

[Tab][Tab]This is an example of text with formatting symbols. [UND]This[SRt]
text is underlined.[und]  [BOLD]This text is bold.[bold]  [Font:CG Times Bold
12 pt][UND]Ein  anderer[und]  stil.[Font:Courier 10cpi]  Original[SRt]
style.[HRt] }—456
         ‾‾‾‾‾‾‾‾‾‾‾‾
            457

*FIG. 5.*

METHOD AND APPARATUS FOR ADDING FUNCTIONALITY TO COMPUTER PROGRAMS EXECUTING UNDER GRAPHICAL USER INTERFACES

BACKGROUND OF THE INVENTION

This invention relates generally to adding functionality to application programs executing in a computer system under a graphical user interface and specifically to adding functionality by simulating user commands and issuing system program commands causing a clipboard utility to transfer information to and from an application program.

Personal computers are used to perform such popular tasks as word processing, database management, spreadsheet calculations, etc. The application programs that perform these tasks are large and complex and offer many versatile functions for the user. However, as is inevitably the case, improvements in the programs, changes in the needs of the user or changes in hardware or operating system software invite the addition of new functional features to the application programs. Additionally, it is advantageous if specific added functions can be provided to two or more application programs operating on the same computer system as this conserves memory use.

A typical way to add new features to an application program is for the original manufacturer to come up with a new release of the software. However, this is often costly and burdensome to the user since the entire application program must be reinstalled in place of the older version. Further, this route is not open to third party software developers who wish to create features for an existing application program that would enhance the usefulness of the application program.

The prior art provides "add on" functionality to existing application programs by using "terminate and stay resident" (TSR) programs. A TSR program is loaded into memory and generally remains there while the application program is executed. The TSR program is inactive until a "hot key" is pressed by the user to invoke the TSR program. Once activated, the TSR program can perform its unique useful function.

An example of a TSR program is known in Europe under the name WAYS and runs on International Business Machines (IBM) compatible personal computers. WAYS observes and interprets screen and keyboard activities taking place in the computer and automatically intervenes to perform its added functions upon the occurrence of certain conditions. The main function of WAYS is to provide automatic spelling correction during the execution of an application program such as a word processing program. If a user mistypes a word, WAYS detects the error and corrects the spelling of the word automatically. WAYS determines when a word has been completely typed in by detecting "whitespace" characters such as a space, tab or carriage return before and after a sequence of characters.

Once a completed word is detected, the spelling of the word is checked instantly against a dictionary database as the user continues typing. If the word is spelled incorrectly, WAYS simulates an appropriate number of backspace keypresses to move the cursor to an insertion point and simulates further keypresses to complete the correct spelling of the word. WAYS is able to do this, in part, because it operates under the Microsoft Disk Operating System (MS-DOS) which allows characters on the screen to be easily read during the execution of an application program. That is, application programs in the MS-DOS environment typically write to the screen in a predefined character graphics mode so that a character on the screen is represented as a value in a location in a memory buffer. Since the character values and memory buffer locations are known and do not change from application program to application program, it is relatively easy to design a TSR that can successfully perform functions based on keystrokes and displayed characters.

A problem arises when modern operating systems using graphical user interfaces (GUIs) are used. Such operating systems, like WINDOWS sold by Microsoft Corp., use bit-mapped graphics rather than the character graphics used in text oriented MS-DOS application programs. Unlike character graphics, bit-mapped graphics do not provide a one-to-one relationship between characters on the display screen and memory locations in the computer system. Thus, it is very difficult, if not impossible, for a program that is external to the application program to be able to detect and identify objects displayed on the screen, such as characters in a word processing program.

A second problem in creating add-on functionality to existing application problems in an operating system that uses a GUI is that user input is not, for the most part, via the keyboard. Rather, a user in a GUI uses a mouse to control a pointer to manipulate menus and windows. This presents a problem in providing the user with uniform and efficient ways to invoke the added functions while still preserving the application program's original functionality and making the overall performance transparent to the application program.

SUMMARY OF THE INVENTION

The present invention allows an add-on program to provide additional functionality to an existing application program that executes under an operating system having a graphical user interface. The invention makes use of a clipboard area provided by the operating system for allowing a user to transfer information between application programs. The invention simulates user actions relating to the clipboard's operation and issues system program commands, e.g., those for specific system functions such as "read mouse cursor position," to allow the add-on program to copy and read images, such as text characters, from the display screen.

A method of the invention allows adding a new function to an application program executing in a computer system where the computer system includes a processor coupled to a user input device and a memory. The memory includes an operating system with a graphical user interface that is responsive to the user input device. The operating system defines a clipboard area in the memory for storing information. The application program is responsive to user input commands generated by the operating system in response to the user input device. The method comprises the steps of detecting that the application program has been activated; installing intercept means in the memory for detecting the communications between the operating system and the application program; intercepting and identifying a predetermined first communication between the operating system and the application program; copying to the clipboard area by issuing a predetermined second communication to the application program in response to the identifying of the first communication, where the second communication includes user input commands that cause original information to be copied from memory and stored in the clipboard area; modifying the copied information stored in the clipboard area; and replacing the original information by issuing a predetermined third communication to the application program, wherein the third communication includes user input commands that cause the modified information to be stored in place of the original information.

BRIEF DESCRIPTION OF THE DRAWINGS

FIG. 1 is an illustration of a computer system suitable for use with the present invention;

FIG. 2 is a diagram of the subsystems of the computer system of FIG. 1 and their interconnections;

FIG. 5 shows embedded format codes within text;

DESCRIPTION OF THE PREFERRED EMBODIMENT

Figure 6:
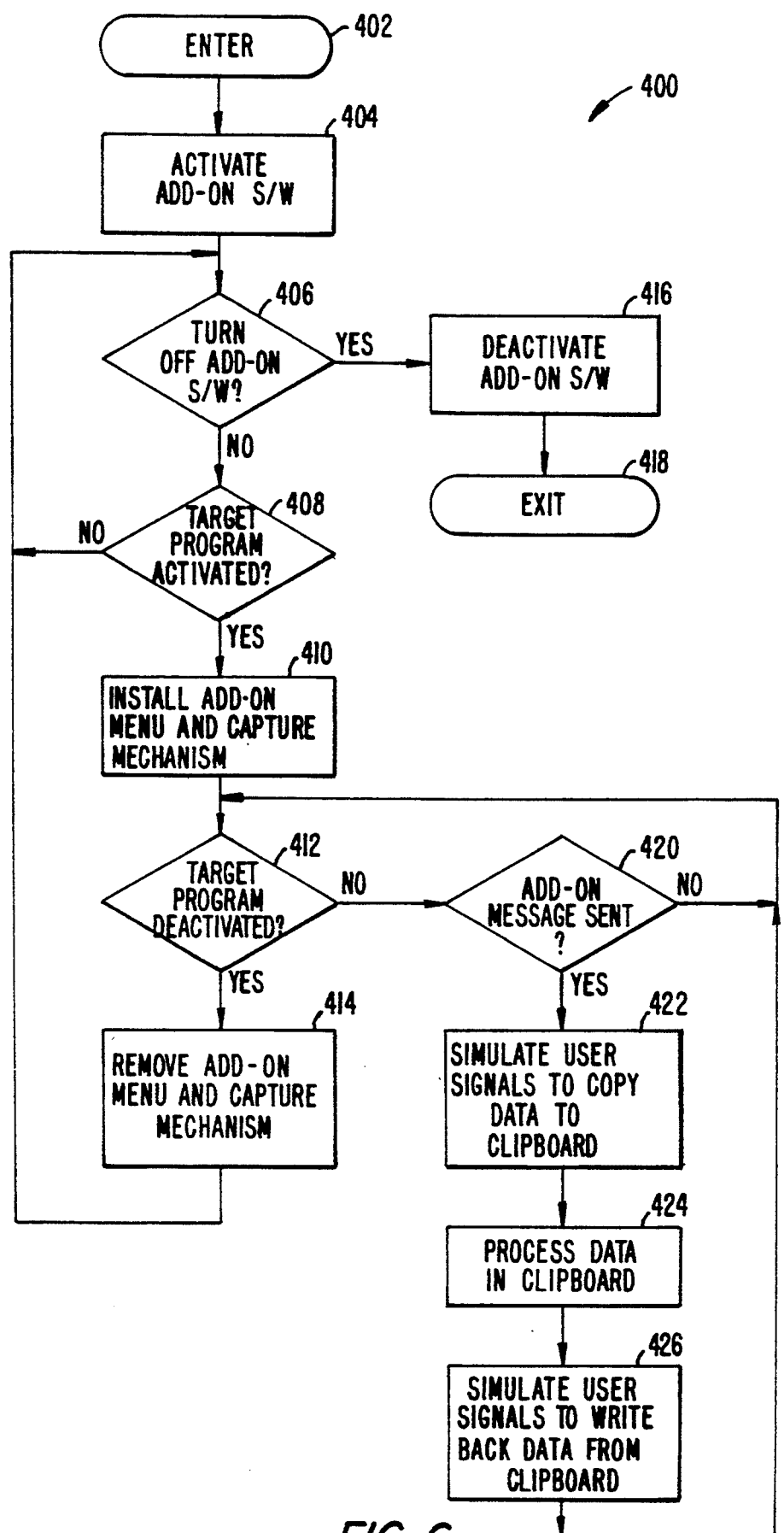
FIG. 6 is a flowchart of a method for adding functionality to an existing application program.

FIG. 1 is an illustration of a computer system suitable for use with the present invention. FIG. 1 depicts but one example of many possible computer types or configurations capable of being used with the present invention. FIG. 1 shows computer system 1 including display device 3, display screen 5, cabinet 7, keyboard 9 and mouse 11. Mouse 11 and keyboard 9 are "user input devices." Other examples of user input devices are a touch screen, light pen, track ball, data glove, etc.

Mouse 11 may have one or more buttons such as buttons 13 shown in FIG. 1. Cabinet 7 houses familiar computer components such as disk drives, a processor, storage means, etc. As used in this specification "storage means" includes any storage device used in connection with a computer system such as disk drives, magnetic tape, solid state memory, bubble memory, etc. Cabinet 7 may include additional hardware such as input/output (I/O) interface cards for connecting computer system 1 to external devices such as an optical character reader, external storage means or other computers and additional devices.

FIG. 2 shows the bus interconnection of basic subsystems of the computer system of FIG. 1. In FIG. 2, bus 50 allows subsystems such as central processor 52 to transfer data to and from system memory 54 and user input devices such as keyboard 56. Other user input devices such as a mouse may be connected via serial port 58 or by a dedicated port (not shown). Communication with other subsystems is possible as shown in FIG. 2.

Figure 3:
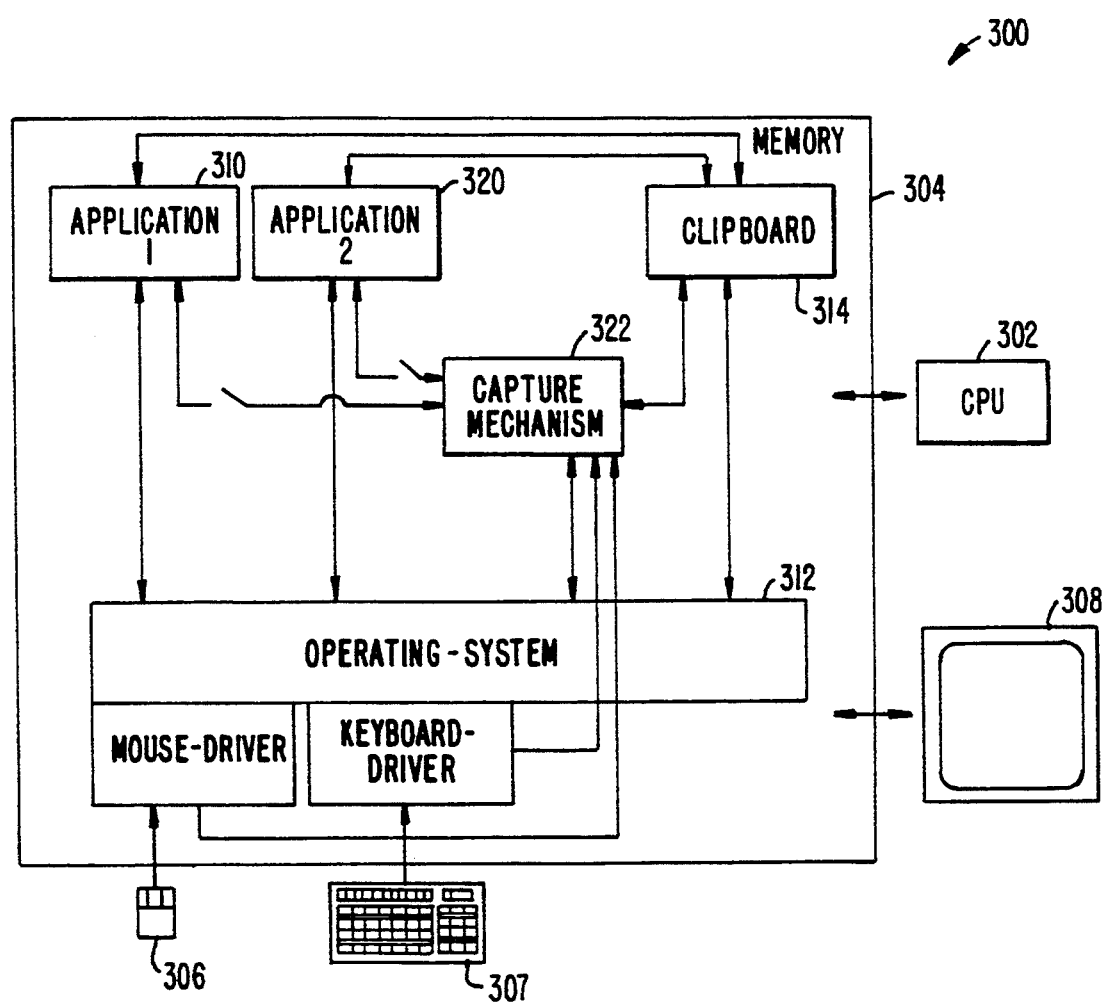
FIG. 3 conceptually illustrates the basic components and data flow of the present invention.

FIG. 3 is a diagram that conceptually illustrates the basic components and data flow of the present invention.

In FIG. 3, some subsystems of computer system 300 are shown. Central Processing Unit (CPU) 302, memory 304, mouse 306, keyboard 307 and display 308 are all basic, well-known components of a computer system.

Memory 304 may include various data structures and executable programs, or processes, illustrated by boxes within memory 304. Lines connecting boxes indicate that information is passed between the processes or data structures represented by the boxes. It should be noted that FIG. 3 is merely a conceptual illustration to show basic data flow and communication between software and hardware entities in the computer system. The utilization of memory 304 changes throughout the course of executing programs on the computer system as data structures and processes are loaded into memory. Many processes and data structures can be resident in memory at one time. Depending on the operating system, two or more processes can be "active" at the same time as in a multitasking operating system. Processes are also "deactivated" at the user's request or by decision of the operating system.

Application program 310 is a process that performs a word processing, data base, or other specific task in communication with operating system 312. In a preferred embodiment, operating system 312 is Microsoft WINDOWS. Other suitable operating systems providing a similar GUI may be employed such as the Macintosh Operating System by Apple Inc. These operating systems use a mouse and windowing GUI that includes a "clipboard" facility. The clipboard facility allows information to be stored in an area of memory designated as a clipboard area such as clipboard 314 of FIG. 3. In some systems the clipboard facility is referred to as a "notebook."

The clipboard is a special facility provided by the operating system that allows a user to move information between application programs. The operating system responds to user signals generated by I/O devices, such as mouse 306 and keyboard 307 of FIG. 3, to transfer information from an application program, such as application program 310, to and from the clipboard area of memory shown as clipboard 314. Note that in a "well-behaved" application program, there is no direct communication between the application program and the clipboard.

In a program such as a word processor, the text to be displayed is stored in a text buffer. The text buffer is used to generate signals to a display device such as display 308. The display device may have memory of its own (e.g., on a display adapter card) and the operating system is used to maintain and control the display using predefined display functions such as changing a dot on the screen, drawing windows, etc. The operating system may maintain additional copies of the display memory for purposes of manipulating this information independently of affecting display 308. Also, application program 310 may have copies of the information stored in the display memory such as colors, locations of objects on the screen, etc.

Assuming application program 310 is a word processor, display 308 is largely controlled by commands originated by application program 310 that invoke functions in operating system 312 for controlling display 308. For example, application program 310 receives information from operating system 312 in response to a user's keypresses or mouse movements from the I/O devices, mouse 306 and keyboard 307. These user inputs cause information to be passed to the application program from the operating system. Application program 310 responds to the user input commands, e.g., to create words in a text buffer, or modify existing words in the buffer. As the user modifies information in a buffer, application program 310 sends commands to operating system 312 to update the display 308. For example, if the user types on the keyboard, the typed text appears on the display screen.

By entering user input commands, the user can cause information in the storage buffer of application program 310 (i.e., text that was already entered) to be transferred to clipboard 314. The transferred information can then be sent to a different application program. For example, application program 310, in response to user input commands, stores some information to clipboard 314 by sending appropriate signals to operating system 312. After the information is transferred, application program 310 can be deactivated, that is, removed from memory 304, and another application program such as application program 320 can be activated. When application program 310 is deactivated, all of its executable code, run-time data structures, buffers, etc., may be removed from memory so that the memory is freed up for other uses. However, the clipboard 314 and information it contains remain intact in memory. Thus, the information can now be transferred to application program 320 under control of operating system 312.

The present invention uses a "capture mechanism" as illustrated by capture mechanism 322 of FIG. 3. The capture mechanism serves to monitor the communication between operating system 312 and application program 310 of FIG. 3. The capture mechanism also accesses I/O drivers such as mouse driver 316 and keyboard driver 318 to allow the capture mechanism to intercept and send I/O messages to operating system 312. This allows capture mechanism 322 to "simulate" user input commands. As shown in FIG. 3, capture mechanism 322 also communicated with clipboard 314 and operating system 312. In a preferred embodiment capture mechanism 322 includes software to perform add-on functionality to application programs such as application program 310. Capture mechanism 322 invokes operating system functions so that messages directed from the operating system to the application program are also sent to the add-on software. Thus, the messages are "captured" or intercepted.

The capture mechanism selectively interrupts the communication between operating system 312 and application program 310 as needed to prevent certain messages from reaching the application program. Capture mechanism 322 monitors the communications between operating system 312 and application program 310 and "passes" most of the communications unaffected, as if capture mechanism 322 were not there. However, capture mechanism 322 is sensitive to selected communications between operating system 312 and application program 310 so as to provide new functions when certain "trigger" communications are detected. The trigger communications are user input signals that indicate that the user has selected a menu option corresponding to the new functions, as described below.

Capture mechanism 322 is a part of the software of the present invention. For ease of illustration, all of the software of the present invention can be considered represented by capture mechanism 322 in FIG. 3. The present invention adds functionality to the application program, in part, by simulating commands from operating system 312 to application program 310 and from user input devices to operating system 312. By simulating the commands, or messages, the software of the present invention is able to transfer information from the application program to the clipboard utility of the operating system, modify the information and transfer the modified information back to the application program.

Note that FIG. 3 shows the capture mechanism selectively in communication with either application program 310 or application program 320. This shows that the add-on functionality provided by the invention can be used with different application programs. This conserves memory and storage space since functionality is provided without duplicating code in two different application programs. That is, spell correction can be provided to both a word processing application program and a database application program by the same add-on software. Additionally, the add-on software can provide functionality that involves the transfer of information between application programs.

The use of clipboard 314 allows capture mechanism 322 to operate on data collected from application program 310 because data stored into clipboard 314 by operating system 312 is in a known data format. This is unlike data within application program 310's data structures and buffers where the data formats are unknown and vary widely among different application programs.

In a preferred embodiment, capture mechanism 322 is a product called "EXWAYS" that operates with an application program, Microsoft WORD. Operating system 312 is a Microsoft WINDOWS version such as Microsoft WINDOWS Version 3.0 or later. EXWAYS is activated by the user from the WINDOWS environment by clicking on an appropriate icon, or automatically upon the execution of a command file. Upon activation, EXWAYS establishes a "hook" for WINDOWS messages by invoking the WINDOWS routine "WH_CallWndProc". This allows EXWAYS to receive messages from WINDOWS about application programs becoming activated or deactivated. EXWAYS is also able to receive communications between the application programs and the operating system.

When EXWAYS detects that the target application, e.g., WORD, is activated EXWAYS modifies the menu displays of the application program to place a new menu in the user interface of the application program that allows the user to select the new functions. This is done by using the WINDOWS routines "GetSubMenu," "InsertMenu" and "DrawMenuBar". The application has no knowledge that the EXWAYS menu now resides in its user interface. In order to properly deactivate the application program, EXWAYS must also detect when the program is being deactivated and remove the added menu at that time.

A preferred embodiment of EXWAYS provides options on the added menu such as "check and correct spelling" and "translate into German." When one of these options is selected, WINDOWS attempts to send notification of the selection to the application program but EXWAYS intercepts the message notification. This is done by "subclassing" the main menu of target application. This has the effect that messages sent for the application program are first sent to EXWAYS. The procedure to accomplish this is by the following assignment: "OldApplWndProc := TFarProc(SetWindowLong(CurApplWnd, gwl_WndProc, LongInt(SubClassProc)));". When the application is deactivated the WINDOWS subclassing is also deactivated by invoking the following procedure: "SetWindowLong- (CurApplWnd, gwl_WndProc, LongInt(OldApplWndProc));".

EXWAYS also ensures that it is informed of "right mouseclicks," i.e. the user depressing the right mouse button, by activating the WINDOWS routine "WH_Mouse". This causes WINDOWS to inform EXWAYS of right mouseclicks and the pointer coordinates at the time of each right mouseclick.

With the ability to capture user input information and present menu information on the display as described above, EXWAYS is able to provide the user with additional options and to sense when the options are selected. The types of additional functions that EXWAYS provides each involve reading text information from the display screen as created by the WORD word processing program. In order to do this, EXWAYS sends user input signals to the operating system to transfer text from the application program to the clipboard. In a preferred embodiment the user has highlighted the text to be processed and the highlighted text is transferred to the clipboard. In an alternate embodiment, the text to be transferred can be indicated in other ways such as by taking all of the text within a page of a document, within character delimiters or other boundaries, etc. The capture mechanism, or add-on program, such as EXWAYS, could also make a decision to automatically transfer text to the clipboard.

The WINDOWS operating system sees the EXWAYS-generated user input signals as any other user input signals. That is, WINDOWS believes these signals are coming from the user. If the user input signals are directed to the operating system (such as invoking the clipboard function) then the operating system performs the function. If the user input signals are directed to the application program (such as in highlighting text) then the operating system passes the signals on to the application program which performs the function. By using the proper combination of user input signals EXWAYS can obtain all or a portion of the text currently being displayed, and can cause undisplayed portions of text to be displayed so that additional text can be transferred to the clipboard.

EXWAYS uses the function "PostMessage" and the (unofficial) Windows function "Keybd_Event" located in the WINDOWS system file "USER.EXE". As an example, to generate user input signals to transfer a word at the current cursor position to the clipboard EXWAYS generates the sequence of commands as follows:

WM_LButtonDown with VK_Control
WM_LButtonDown with VK_Insert
WM_LButtonUp with VK_Insert
WM_LButtonUp with VK_Control EXWAYS uses the function "GetClipboardData" to pick up the information for subsequent processing to accomplish the added functions.

Next, FIGS. 4A and 4B will be discussed to show an application program and how the present invention adds new functionality to the application program. While this example uses a word processing program as the "target" application program, that is, the application program to which functionality is being added, any application program may be successfully used with the present invention. In general, the program that is adding functionality is referred to as the "add-on" program.

Figure 4A:
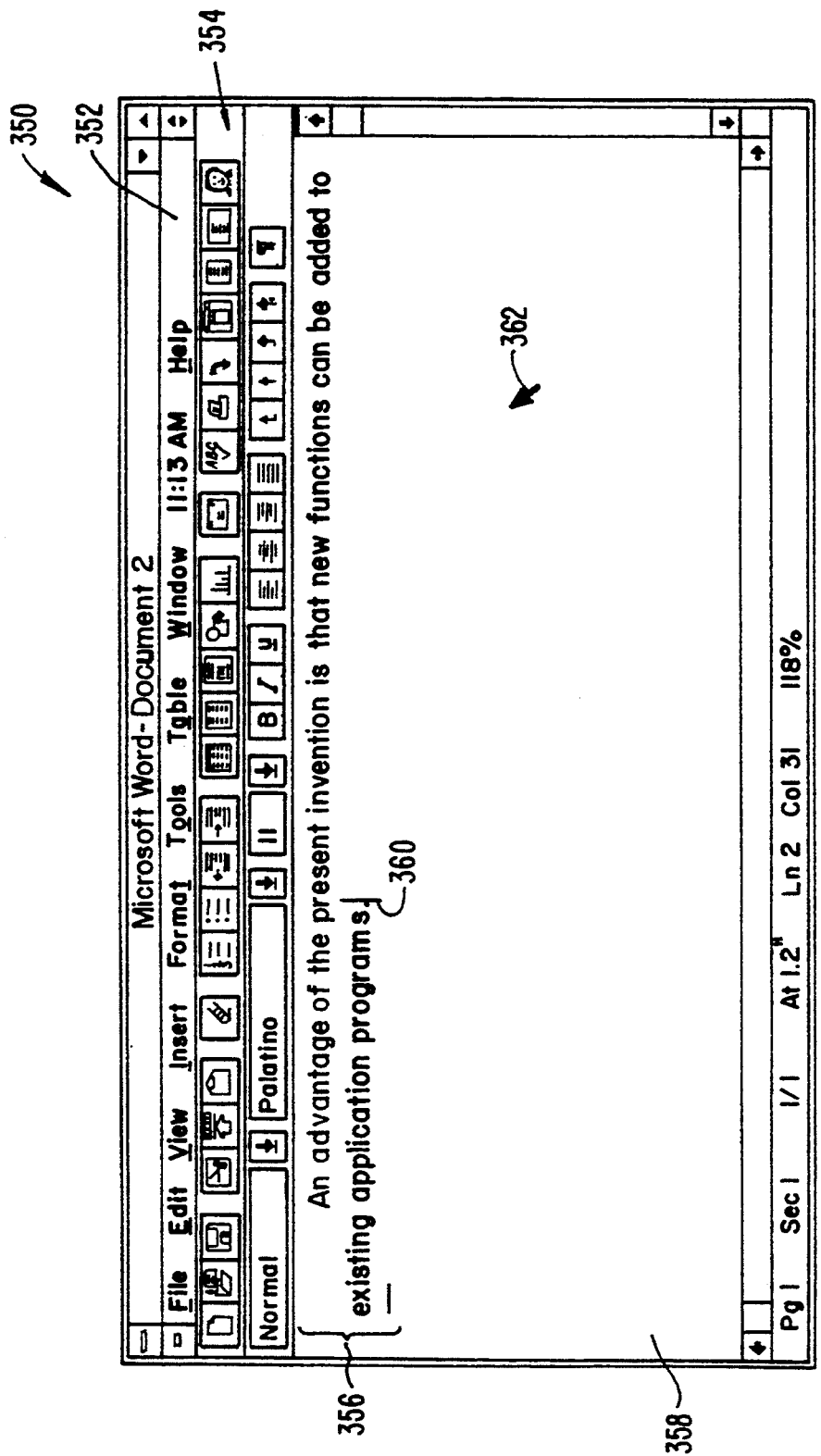
FIG. 4A is an illustration of a screen display of a word processing program.

FIG. 4A shows a screen of the application program, Microsoft WORD, by Microsoft, Inc. Microsoft WORD is a word processing program that has many characteristics in common with typical word processing programs. In FIG. 4A, window 350 contains the information and user interface for operating the word processor. In particular, main menu bar 352 includes menus named "File", "Edit", "View", etc. The main menu bar functions in a standard way allowing the user to click on each menu name whereby the program displays a list of options in the menu. The list of options includes menu items selectable by the user.

Icons such as icons at 354 provide further functions that are selectable by the user. Text at 356 in text window 358 displays current text that the user has typed in. Text is entered in at a cursor position such as cursor 360 of FIG. 4A. Pointer 362 allows the user to select menus, icons, etc.

In Microsoft WORD, as is typical of word processing programs, once text has been entered the text may be "spell checked" to automatically detect and correct spelling errors. Spell checking is usually invoked after a first draft of a document is completed and is performed over the document as a whole. Alternatively, spell checking may be performed over a block of text. At any rate, the user first enters a substantial portion of text and then invokes the spell checking feature.

Figure 4B:
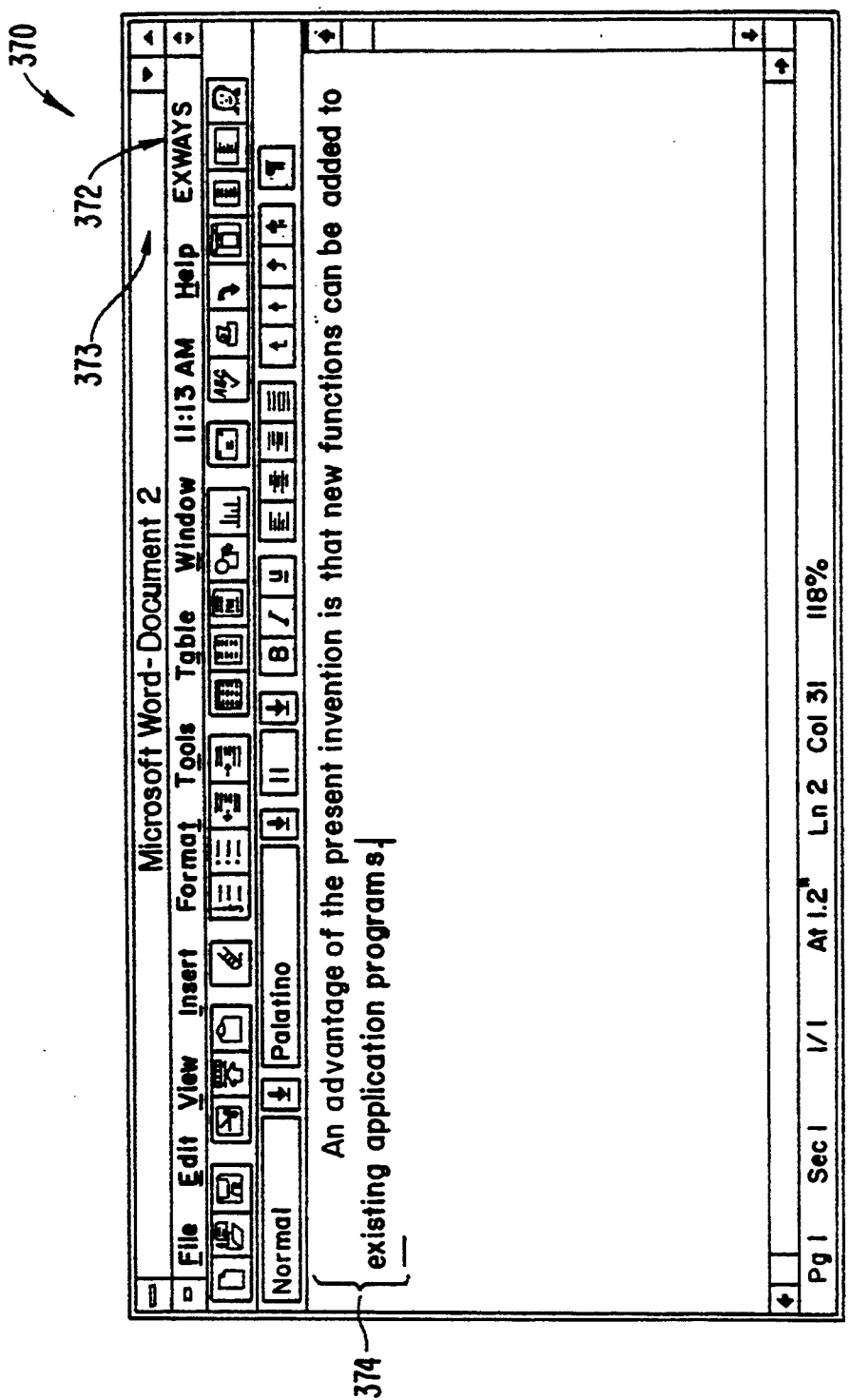
FIG. 4B is the illustration of FIG. 4 with the addition of an EXWAYS menu.
Figure 6:
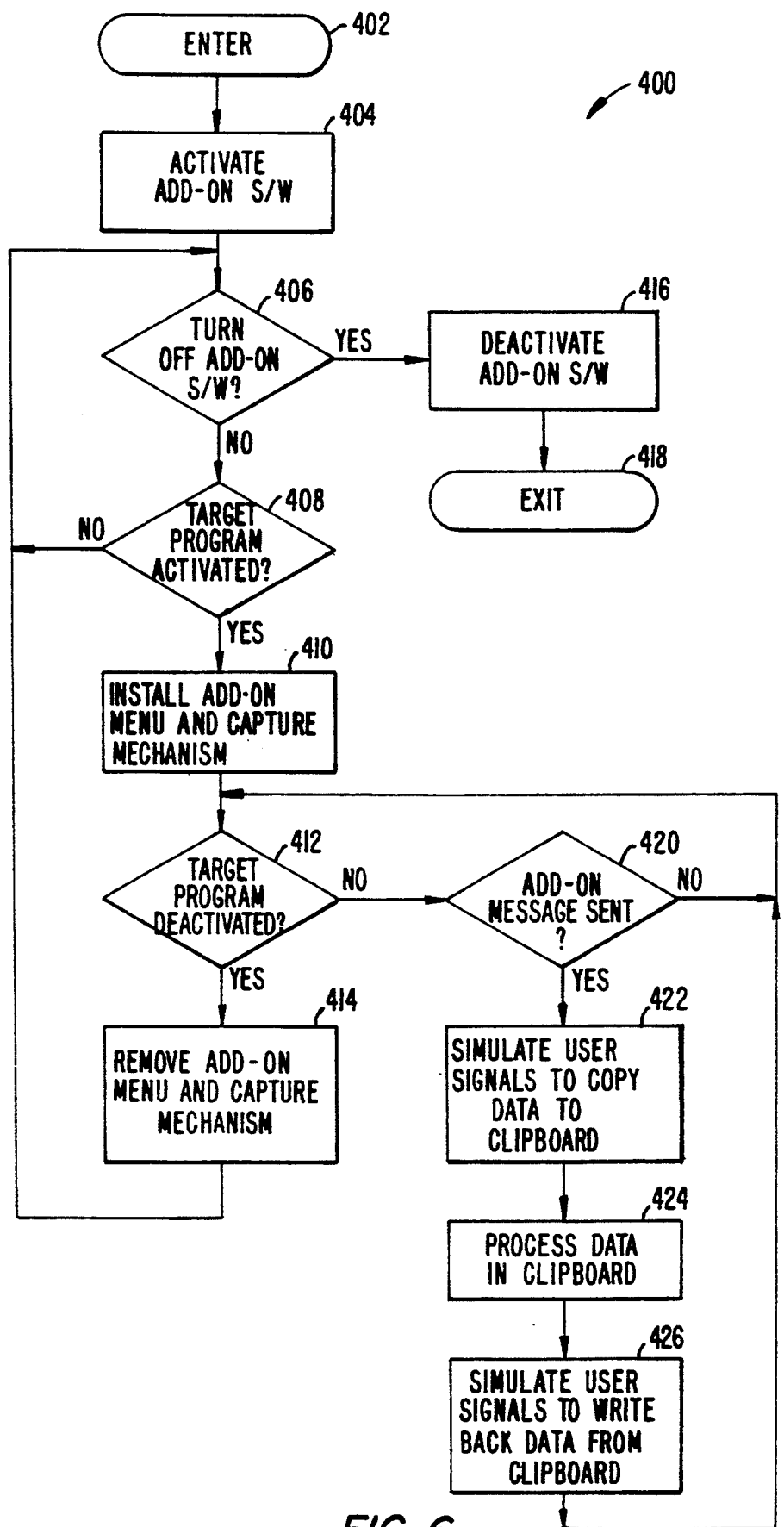

FIG. 4B shows a word processing user interface window 370 similar to window 350 at FIG. 4A. In FIG. 4B, main menu bar 372 includes an extra menu called "EXWAYS" which is the name of the add-on program in this example. Note that "EXWAYS" menu title is to the right of the pre-existing "Help" menu title. Depending on the original layout of the main menu bar in the application program, it may be necessary to shift the menu names around or make them smaller to accommodate the "EXWAYS" menu title. In some applications the main menu bar, or command line, may be missing. In this case the EXWAYS menu title is placed on the title bar at, for example, 373 of FIG. 4B.

The invention modifies the main menu bar by inserting the EXWAYS menu header and allows the user to click on the EXWAYS menu header to provide a list of menu items for invoking additional functions in the Microsoft WORD word processor. One such additional function is "Dynamic Spell Checking". This can be thought of as on-the-fly spell checking in that the spell checking is done automatically as the user completes the typing of each word. In other words, in the sentence displayed at 374 of FIG. 4B, spell checking would be performed for each word as it is typed in so that "An" is checked prior to, or concurrently with, the user entering in the next characters to spell the next word, "advantage" and so on. This is added functionality since the original application program, Microsoft WORD, does not provide for on-the-fly spell checking.

The on-the-fly spell checking is an option that is turned on and off from the EXWAYS menu on the main menu bar. The invention could alert the user to a spelling error and allow the user to have the error automatically corrected at the user's discretion. In a preferred embodiment, the spell checker alerts the user with a beep and performs the correction automatically by analyzing the use of the word in the context of the sentence to make an intelligent decision as to the correct spelling. This provides an advantage to the user in that repeated misspellings of a word are avoided. Also, once the user has completed the text document it is not necessary to perform the spell checking function which can be time consuming if the document is lengthy.

Many word processing programs use text format symbols embedded within the text. The format information keeps track of which words are bold, underlined, italicized, in different fonts, etc. If formatted text is merely copied from these programs, replaced with other text without regard to the formatting information and then written back, the formatting information would be lost and the text would not appear as it should in accordance with the original formatting. It is difficult to provide for correct handling of formatting information since application programs have different codes for various formats. Also, the codes could change from time to time with different versions of a word processing program so that any add-on features provided by the add-on software, such as EXWAYS, would become obsolete with respect to format codes that change.

EXWAYS handles formatted text in a special way so that the formatting information is preserved regardless of the format codes used. FIG. 5 shows two lines of text at 450 from the word processing program "Word Perfect" to show how underlined text, emboldened text and text of a different font appear when printed. The lines at 452 show the same text with embedded format codes shown in square brackets. The format codes are actually one or more numbers that are known to the application program. For convenience they are shown as terms in square brackets. The numbers are generally unknown to the add-on program, that is, it is impossible for the add-on program to discern characters from format codes, much less identify what the format codes mean without putting special information into the add-on program on a case-by-case basis depending on the current type and version of word processing program that the add-on program is being used with.

Instead, EXWAYS processes the text one word at a time so as to bypass format codes from its processing. Every word processing program allows a single word to be transferred to the clipboard. By transferring a single word, the format information that is adjacent to, or outside of the word, is not transferred to the clipboard. Thus, EXWAYS is able to modify, replace or eliminate the word without having to take special steps to preserve format information in the form of format codes. A drawback of this is the any format codes embedded within a single word may be lost or improperly handled. However, the occurrence of a format code within a single word is rare.

In a preferred embodiment, EXWAYS performs the word-for-word processing by positioning the cursor of the application program at the end of a block of words to be processed. This is done with the simulated keystrokes as follows:

WM—LButtonDown with VK—Right
WM—LButtonUP with VK—Right

Next, a complete single word is "marked" or highlighted to the left of the cursor with the following simulated keystrokes:

Kc WM—LButtonDown with VK—Control
WM—LButtonDown with VK—Shift
WM—LButtonDown with VK—Left
WM—LButtonUp with VK—Left
WM—LButtonUp with VK—Shift
WM—LButtonUp with VK—Control The marked word is transferred to the clipboard using operating system procedure calls such as "WM— PASTE" to add text. The transferred word is processed as, for example, in a language translation function. The word is replaced and the next preceding word is then processed in a similar manner until all of the words in the block are translated.

For example, FIG. 5 shows the text, including format codes, at 454 where the word "style" at 453 in lines 452 has been translated to the German word "Stil" at 455 in lines 454. Note that by using the above method, only the text "style" and not "style.[Font:Courier 10 cpi]" is obtained and transferred to the clipboard for translation. Similarly, at 456 the text is shown after the next word "Another" at 451 has been transferred, translated and replaced with "Ein anderer" at 457. Note that the underlining of the German term "Ein anderer" is maintained since the original English word "Another" was underlined. This is a result of only transferring, translating and replacing words one-at-a-time to bypass the [UND] and [und] format codes surrounding "Another".

Some applications such as WordPerfect and Word use a standardized formatting for text called Rich Text Format (RTF). EXWAYS is able to recognize and preserve the RTF format codes. In the case of RTF format codes, the one word at a time approach described above need not be used.

Next, FIG. 6 is discussed to illustrate a routine for executing a method for adding functionality to a target application program.

In FIG. 6, flowchart 400 represents one or more software routines executing in a computer system such as computer system 1 of FIG. 1. Flowchart 400 may be implemented by any means as is known in the art. For example, any number of computer programming languages, such as "C" Pascal FORTRAN, assembly language, etc., may be used. Further, various programming approaches such as procedural or "object oriented" programming, or artificial intelligence techniques, may be employed. The steps of flowchart 400 may be implemented by one or more software routines, processes, subroutines, modules, etc. It will be apparent that flowchart 400 is illustrative of but the broad logical flow of the method of the present invention and that steps may be added to, or taken away from, flowchart 400. For ease of discussion, we will refer to the implementation of flowchart 400 as if it was a single "routine".

The routine of flowchart 400 is entered at step 402. The routine is invoked, or activated, prior to executing a target application program to which new functions are provided by the add-on software of the present invention. Typically, the routine of flowchart 400 of FIG. 6 is activated near the beginning of a user's session with the computer, i.e., when the computer is "powered on" or "booted up."

Once the routine of flowchart 400 is entered at step 402 execution proceeds to step 404 where the add-on software is "activated." As discussed above, activation of the add-on software causes the add-on software to implement "hooks" to the operating system so that the operating system informs the add-on software when target application programs are later activated. In a preferred embodiment, the add-on software is EXWAYS and the target application program is Microsoft WORD word processing software. Additionally, EXWAYS uses other programs such as WAYS and GLOBALINK GTS during the course of performing steps of the routine of flowchart 400 as described below.

Next, step 406 is executed where a test is made as to whether the add-on software is to be turned off. Typically, the add-on software will be deactivated or turned off towards the end of the computer session or if the user no longer desires the added functionality. When it is desired to turn off the add-on software, execution proceeds to step 416 where the add-on software is deactivated. Essentially, this means that the operating system is informed to no longer send messages to the add-on software and other operations such as the add-on software-acquiring keystrokes and mouse input signals are disabled. The routine of flowchart 400 is then exited at step 418.

If, at step 406, it is not desired to turn off the add-on software, execution proceeds to step 408. At step 408, a check is made to test whether the target program has been activated. In a preferred embodiment, step 408 is performed by EXWAYS (the add-on software) receiving a message from the operating system indicating that an application program has been activated. EXWAYS checks to determine whether the application program just activated is the target application program, namely, Microsoft WORD. If so, execution proceeds to step 410 where EXWAYS initiates steps to provide additional functionality to Microsoft WORD. Until the target program activation is detected, execution remains in the loop of steps 406 and 408 as shown in the flow-chart of FIG. 6. The manner in which steps 406 and 408 are handled may vary from system to system and from implementation to implementation. For example, depending on the operating system, the method of indicating that an application program has become activated may differ. One option is that the add-on software can bypass the operating system messages entirely and simply monitor key presses and mouse movements to determine when the user has initiated, activated or launched the target application program. Similarly, the add-on software program can monitor disk accesses or memory usage to determine when an application program is executed. The notification from the operating system need not be by transfer of messages, but can be, e.g., via an interrupt.

Once the activation of the target program has been detected, execution of the routine of flowchart 400 continues to step 410. At step 410, the add-on software installs a new menu and capture mechanism. As described above, the new menu added by EXWAYS is provided by invoking operating system functions for adding a menu to the main menu bar in the application. The capture mechanism in EXWAYS running under WINDOWS includes invoking several WINDOWS procedures for ensuring that EXWAYS receives messages destined for the target application program. Specifically, EXWAYS ensures that the operating system informs it of right mouse clicks and mouse positions.

At step 412 a test is made as to whether the target program has been deactivated. As long as the target program is active, execution continues through steps 412 and 420. At step 420, a check is made as to whether a message has been sent for the add-on software to handle. If not, execution continues in the loop of steps 412 and 420. If a message is detected that concerns the add-on software, execution continues to step 422.

At step 422, the add-on software simulates user signals to copy data from the target application program to the clipboard of the operating system. In a preferred embodiment, the EXWAYS program is able to copy data from WORD in several ways. One way is by detecting the position of the current cursor location and, if the cursor is within a word of text on the screen, copying that word of text to the clipboard as a single word. Alternatively, if one or more words are highlighted on the screen EXWAYS detects the highlighted words and transfers the entire group of words to the clipboard. Another way to transfer text is where a group of text on the screen has been designated as a block by user operations or by operations within the word processing program. The block of text may then be transferred. Yet another way of transferring text is to transfer an entire file of text to the clipboard as designated by the user. EXWAYS does this by simulating user input commands to highlight the entire text as a single marked block. A preferred embodiment uses simulated keypress commands but simulated mouse commands could also be used. Where a database program is used, various data and field names displayed by the data base program and designated by the user or the program may be similarly handled as described above for a word processing program. In general, any application program that allows the user to designate information for transfer to the clipboard can be used in accordance with the present invention.

The signals that the add-on software sends to the operating system and/or the target application program vary according to the specific operating system and application program in use. For example, Microsoft WORD provides several different ways to designate, or highlight, a word of text. One way is for the user to use the mouse to position the cursor within a single word. Then, the user depresses the F8 key twice and the word is highlighted. Another way to highlight a word is to place the cursor at the beginning of the word and highlight the word by depressing the SHIFT, CONTROL and RIGHT ARROW keys simultaneously. The add-on software merely simulates one of the above sequences to accomplish single word highlighting. Once a word is highlighted the CONTROL and INSERT keys are depressed to copy the text to the clipboard. Again, these keypresses are simulated by the add-on software.

At the completion of step 422, data from the application program has successfully been transferred to the clipboard. Once in the clipboard, the add-on software has convenient access to the data since the data is in a known format and the operating system is able to provide this data to various programs including the add-on software program.

Step 424 is executed to process the data in the clipboard. Step 424 is the point at which the actual added functionality takes place. In EXWAYS, the added functionality performed at step 424 includes spelling correction, as discussed above; word-by-word language translation; interpreting and solving mathematical calculations and providing a result; detecting Zip-Codes and providing the name of a town, state, etc.; accessing encyclopedias for key words; invoking external programs according to words or word groups (e.g., checking drug names in a medical history to provide information about the drug on the screen such as "Side Effects, Prescription Needed"; or detecting a key phrase such as "pic New York" and removing the phrase and inserting a picture into the document at that point in the text, instead); modifying the font, capitalization, color, underlining, etc. of text as in translating underlined words into italics; or performing complex automatic searches based on a word or phrase where the word or phrase is used to invoke a search program to access additional data based on the key word or phrase. In the preferred embodiment, much of the added functionality performed at step 424 is done by a program separate from EXWAYS called WAYS.

At step 426 the add-on software simulates user signals to write the modified data from the clipboard back to the target application program. Typically, the data will be written in place of the original data as copied from the application program. In a preferred embodiment, this means that, for example, where a spelling correction has taken place, the user sees the corrected word or words on the display screen substantially corresponding to the positions of the original misspelled word or words. Similarly, where the added functionality is in a word-for-word translation, the user will see, e.g., German words exchanged on the screen for the original English words. Where Microsoft WORD is the application program, the simultaneous kepresses of SHIFT and INSERT place information from the clipboard at the current cursor location.

Steps 412 and 420–426 are repeated to detect more messages for handling by the add-on software. Thus, the additional functions may be performed many times within the course of executing the target application program. Finally, when the target program is deactivated, execution falls to step 414 of the routine of flowchart 400 where the add-on software removes the add-on menu and the capture mechanism from both the application program and the memory of the computer system. Step 414 is typically performed before the application program has been deactivated so that the application program may deactivate itself according to its own software instructions which do not take into account the existence of added menus. Execution then returns to the loop of steps 406 and 408 where the add-on software remains dormant in a monitoring mode to wait for the next activation of target software. Note that provision can be made for handling more than one target application program. This is true even where multiple application programs are executed concurrently in a multitasking environment.

Thus, it has been shown that the routine of flowchart 400 of FIG. 6 illustrates the basic steps for a method to add functionality to an existing application program. The added functionality is provided by add-on software that looks for a target application program and uses the clipboard provided by the operating system in a GUI environment to transfer, modify and rewrite information such as text.

Other possibilities for adding functionality by using the method and apparatus of the present invention do not require that information be modified and rewritten back to the application program. For example, once a word has been selected it can be used to look up information in a compact disk read-only memory (CD-ROM). Thus, when the user has selected, or highlighted, a word such as "Chicago" and a predefined menu command is activated in the add-on menu the add-on software retrieves the information from the CD-ROM and displays it on the screen.

The reading or detecting of the selected word is via the clipboard as discussed above. The add-on software may have to convert the word to a different format or look-up a keyword to be used in the search of the CD-ROM. This allows a second application program, such as Compton's Encyclopedia on CD-ROM, to be used to perform the accessing. The add-on software sends signals to the Compton's program to display the information about Chicago on the screen.

Figure 7A:
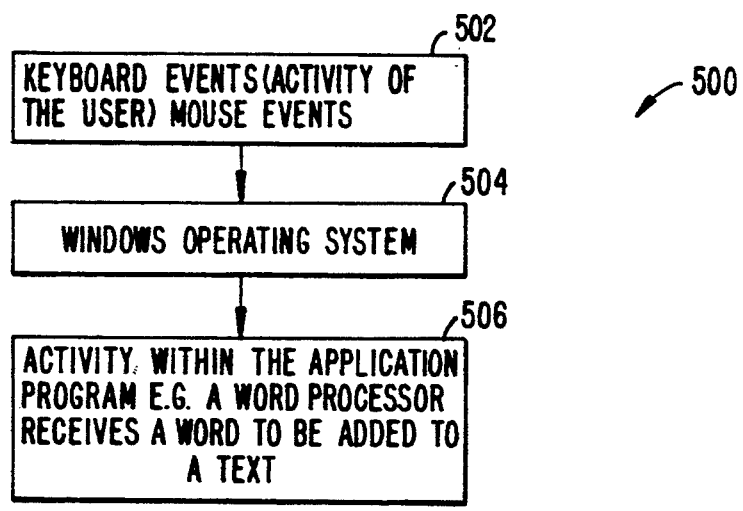
FIG. 7A is an event flowchart for a computer system without the present invention.
Figure 7B:
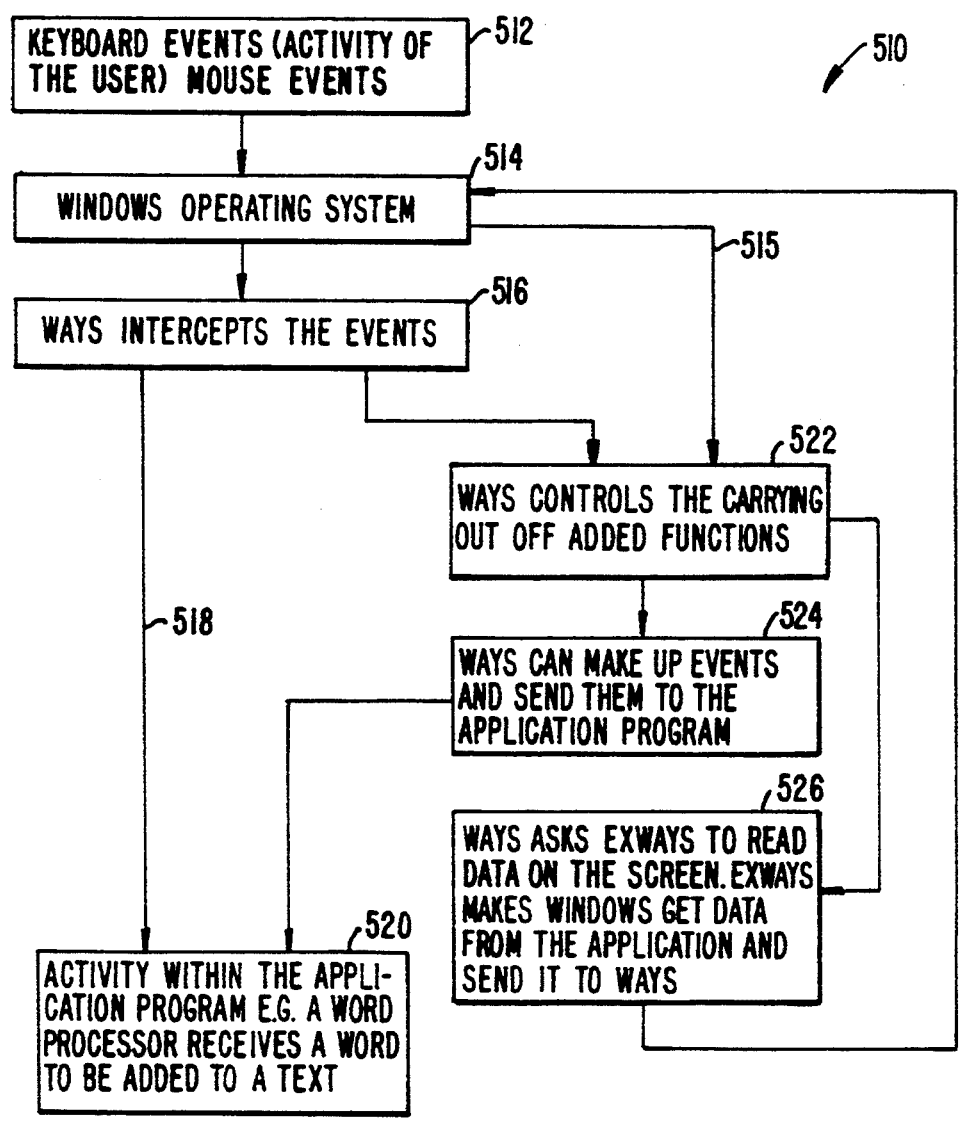
FIG. 7B is an event flowchart for a computer system using the present invention.

FIGS. 7A and 7B show the flow of "event" handling in a system without the present invention (FIG. 7A) and in a system using the present invention (FIG. 7B).

FIG. 7A shows event flowchart 500 in a computer system running an application program 506 without the present invention. In event flowchart 500, events are user input signals generated by the user via the mouse or keyboard as indicated by user events 502. The user events are passed to operating system 504 which generates messages or other communications to application program 506. Some events may not generate communications to application program 506 since they are handled solely by operating system 504.

FIG. 7B shows event flowchart 510 in a computer system running application program 520 along with the present invention. In a preferred embodiment, the invention is implemented in two computer programs working together. The two programs are WAYS and EXWAYS. WAYS acts as a controller while EXWAYS performs the lower level function of transferring information to and from the application program in a GUI environment.

In FIG. 7B, user events are generated at 512 similar to FIG. 7A. The events are received by operating system 514, but instead of generating messages directly to application program 520, the messages are captured by software of the invention at 516. Most of the events are communicated to application program 520 as shown by arrow 518. However, some of the events are not communicated to the application program but are sent to the WAYS program at 522. WAYS then determines what action to take based on the communications. The communications that demand action on the part of WAYS/EXWAYS are those where the user is invoking the added functionality provided by the invention. In order to perform some of the added functions, WAYS can cause events to be simulated and sent to the application program as shown at 524. Alternatively, some functions may require that information be read from the screen by EXWAYS as shown at 526.

If information is read from the screen by EXWAYS at 526, the information is routed back to the WINDOWS operating system via the clipboard. The information is then accessible to WAYS as shown through the path 515. WAYS can process the information and further control both the application program and the operating system by sending events, invoking operating system procedures and capturing information to the clipboard.

Thus, it has been shown above that by implementing the event flow as shown in FIG. 7B, the invention is able to capture messages from the operating system to invoke added functionality that is implemented by simulating user input signals, or events, and by using the clipboard to transfer data from an application program. Other arrangements for event flow and control are possible and remain within the scope of the present invention.

While the invention has been described as a separate software entity from both the target application program and the operating system, the software of the present invention can be incorporated into either the operating system or an application program with the same result. For example, in FIG. 3, capture mechanism 322 (optionally having code to perform add-on functions) can be included in operating system 312. This would result in the box for capture mechanism 322 being drawn inside of the box for operating system 312 along with routing capture mechanism 322's connections, accordingly. Similarly, capture mechanism 322 could be implemented inside of either of application programs 310 or 320.

It is advantageous to include the capture mechanism within an operating system. For example, if an operating system such as Microsoft's WINDOWS includes a capture mechanism for transferring text or other information to and from an application program via the clipboard the capture mechanism becomes a feature of the operating system that manufacturers of add-on software can utilize consistently in a standard way. The operating system is able to provide powerful functions for automatically moving text to and from the display screen regardless of the type of host application program that creates the display. Examples of such functions are a command to move n words to the right and below the current cursor position to the clipboard, automatically transferring an entire file or document to the clipboard, transferring format codes along with text to the clipboard, etc.

When the capture mechanism is integrated with the software of the operating system there is no longer a need to simulate user input signals in order to transfer information to/from the clipboard. Thus, the transfer of information can be greatly accelerated and made more versatile. By providing advanced operating system functions for transferring information to/from the clipboard add-on software can be designed that provides extra functionality to pre-existing application programs similar to the discussion above where the capture mechanism is separate from the operating system.

In the foregoing specification, the invention has been described with reference to a specific exemplary embodiment thereof. It will, however, be evident that various modifications and changes may be made thereunto without departing from the broader spirit and scope of the invention as set forth in the appended claims. For example, various programming languages and techniques can be used to implement the disclosed invention. Also, the specific logic presented to accomplish tasks within the present invention may be modified without departing from the scope of the invention. Many such changes or modifications will be readily apparent to one of ordinary skill in the art. The specification and drawings are, accordingly, to be regarded in an illustrative rather than a restrictive sense, the invention being limited only by the provided claims.

What is claimed is:

1. A method for adding a new function to an application program executing in a computer system, the computer system including a processor coupled to a user input device and a memory, wherein the memory includes an operating system with a graphical user interface responsive to the user input device, wherein the operating system provides a clipboard area in the memory for storing information, wherein the application program is responsive to user input commands generated by the operating system in response to the user input device, the method comprising the following steps executed by the processor:

detecting that the application program has been activated;
 installing capture means in the memory for detecting the communications between the operating system and the application program;
 detecting a predetermined first communication between the operating system and the application program;
 copying first information from the application program to the clipboard area by issuing a predetermined second communication to the application program in response to the identifying of the first communication, wherein the second communication includes user input commands that cause the first information to be copied and stored in the clipboard area;
 modifying the copied information stored in the clipboard area; and
 replacing the first information in the application program by issuing a predetermined third communication to the application program, wherein the third communication includes user input commands that cause the modified information to be stored in place of the first information.

2. The method of claim 1, further comprising the steps of:
 detecting that the application program has been deactivated; and
 subsequent to the detection of the deactivation of the application, removing the capture means from the memory.

3. The method of claim 1, wherein the application program displays a list of menus on a menu bar, wherein a menu includes a list of items that are selectable in response to signals from the user input device, the method further including the steps of:
 displaying an additional menu in the displayed list of menus, wherein the additional menu includes a new item;
 checking the detected communications to determine that the new item has been selected; and
 performing a new function corresponding to the selected item.

4. The method of claim 1, wherein the computer system further includes a display, wherein the application program is a word processing program that stores one or more words in memory and displays the words on the display, the method further including the step of:
 wherein the step of copying includes the substep of issuing user input commands to store one or more words in the clipboard area.

5. The method of claim 4, further comprising the step of:
 wherein the step of modifying the information stored in the clipboard area includes correcting the spelling of a word in the clipboard area.

6. The method of claim 4, further comprising the step of:
 wherein the step of modifying the information stored in the clipboard area includes translating a word in the clipboard area into another language.

7. The method of claim 4, wherein formatting information is stored between the words in memory, wherein the sequence of steps of transferring, modifying and replacing a block of a plurality of words occurs one word at a time in order to preserve the formatting information stored between the words in memory.

8. The method of claim 4, wherein the words stored in memory are in a standardized text format.

9. The method of claim 8, wherein the standardized text format is Rich Text Format.

10. The method of claim 1, wherein the predetermined first communication is generated in response to one or more keypresses on a keyboard by a human user.

11. The method of claim 1, wherein the predetermined first communication is generated in response to the manipulation of a mouse input device by a human user.

12. The method of claim 1, wherein a portion of the capture mechanism is a part of the operating system.

13. A method for adding a new function to an application program executing in a computer system, the computer system including a processor coupled to a user input device and a memory, wherein the memory includes an operating system with a graphical user interface responsive to the user input device, wherein the operating system defines a clipboard area in the memory for storing information, wherein the application program is responsive to user input commands generated by the operating system in response to the user input device, the method comprising the following steps executed by the processor:

detecting that the application program has been activated;

installing capture means in the memory for detecting the communications between the operating system and the application program;

detecting a predetermined first communication between the operating system and the application program, wherein the first communication identifies first information in the application program;

copying the first information to the clipboard area by issuing a predetermined second communication to the application program in response to the identifying of the first communication, wherein the second communication includes user input commands that cause the first information to be copied and stored in the clipboard area; and using the computer system to perform an action in response to the information copied to the clipboard area.

14. The method of claim 13, the method further including the steps of:

wherein the step of "using the computer system" includes the substeps of using the copied first information to retrieve visual information from a storage device coupled to the computer system, wherein the visual information is related to the first information; and displaying the retrieved visual information to the user.

15. An apparatus for adding a new function to an application program executed by a computer system, the computer system including a processor coupled to a user input device and a memory, the apparatus comprising:

an operating system having a graphical user interface, wherein the operating system is executed by the computer system;

a clipboard area coupled to the operating system, wherein the application program is responsive to user input commands generated by the operating system in response to the user input device;

detecting means for detecting that the application program has been activated;

capture means for monitoring the communications between the operating system and the application program to detect certain predetermined communications, wherein the capture means includes means for detecting a predetermined first communication between the operating system and the application program;

installation means coupled to the detecting means for installing the capture means into the memory;

copying means coupled to the capture means for copying information to the clipboard area by issuing a predetermined second communication to the application program in response to the identifying of the first communication, wherein the second communication includes user input commands that cause first information to be copied from memory and stored in the clipboard area;

modification means for modifying the copied information stored in the clipboard area; and replacing means for replacing the first information by issuing a predetermined third communication to the application program, wherein the third communication includes user input commands that cause the modified information to be stored in place of the original information.

16. An apparatus for adding a new function to an application program executed by a computer system, the computer system including a processor coupled to a user input device and a memory, the apparatus comprising:

an operating system having a graphical user interface, wherein the operating system is executed by the computer system;

a clipboard area coupled to the operating system, wherein the application program is responsive to user input commands generated by the operating system in response to the user input device;

detecting means for detecting that the application program has been activated;

capture means for monitoring the communications between the operating system and the application program to detect certain predetermined communications, wherein the capture means includes means for detecting a predetermined first communication between the operating system and the application program;

installation means coupled to the detecting means for installing the capture means into the memory;

copying means coupled to the capture means for copying information to the clipboard area by issuing a predetermined second communication to the application program in response to the identifying of the first communication, wherein the second communication includes user input commands that cause original information to be copied from memory and stored in the clipboard area; and processing means for performing a predetermined function based on the information copied to the clipboard area.

* * * * *